US011333877B1

(12) United States Patent
Su

(10) Patent No.: US 11,333,877 B1
(45) Date of Patent: May 17, 2022

(54) HANDHELD MAGNIFYING LENS

(71) Applicant: Hong Ann Tool Industries Co., Ltd., Taichung (TW)

(72) Inventor: Cheng-Wei Su, Taichung (TW)

(73) Assignee: Hong Ann Tool Industries Co., Ltd., Taichung (TW)

( * ) Notice: Subject to any disclaimer, the term of this patent is extended or adjusted under 35 U.S.C. 154(b) by 0 days.

(21) Appl. No.: 17/128,385

(22) Filed: Dec. 21, 2020

(51) Int. Cl.
*G02B 7/02* (2021.01)
*G02B 25/00* (2006.01)

(52) U.S. Cl.
CPC .................... *G02B 25/002* (2013.01)

(58) Field of Classification Search
CPC .................................... G02B 25/002
See application file for complete search history.

(56) References Cited

U.S. PATENT DOCUMENTS 8,449,155 B2  5/2013 Su
2015/0226955 A1* 8/2015 Casoria .................. G02B 25/02
362/104

\* cited by examiner

*Primary Examiner* — James C. Jones
(74) *Attorney, Agent, or Firm* — Karin L. Williams; Alan D. Kamrath; Mayer & Williams PC

(57) ABSTRACT

An handheld magnifying lens includes a body and a lens. The body includes a lens frame. The lens is arranged in the lens frame and has a convex curved surface and a concave curved surface opposite to the convex curved surface. A curvature radius of the convex curved surface is less than a curvature radius of the concave curved surface to avoid glare.

6 Claims, 3 Drawing Sheets

HANDHELD MAGNIFYING LENS

BACKGROUND OF THE INVENTION

The present invention relates to a magnifying lens and more particularly, to a handheld magnifying lens.

U.S. Pat. No. 8,449,155 discloses an illuminating magnifying lens capable of focusing its light on objects, which comprises a frame connected to a handle, and in a part of the handle jointing to the frame is defined an assembling groove in which being assembled a lamp, a battery and a light guiding member. When the magnifying lens is used to magnify the object, the projecting light of the lamp is restricted by the light guiding member and can only be emitted out from the open end of the guiding hole, plus there is projecting angle between the guiding hole and the lens element, therefore, the light of the lamp will be directed toward the object without projecting onto the lens element, thus preventing dazzling reflection.

The above magnifying lens is designed to avoid glare by using the lamp that do not directly emit light to the lens surface. However, the magnifying lens is more often used in bright environments. Although the lamp of the magnifying lens will not cause glare, natural light in the environment may still cause glare.

Thus, a need exists for a novel handheld magnifying glass that mitigates and/or obviates the above drawbacks.

BRIEF SUMMARY OF THE INVENTION

A handheld magnifying lens according to the present invention includes a body and a lens. The body includes a lens frame. The lens is arranged in the lens frame and has a convex curved surface and a concave curved surface opposite to the convex curved surface. A curvature radius of the convex curved surface is less than a curvature radius of the concave curved surface.

In an example, a first thickness is formed between a center of the convex curved surface and a center of the concave curved surface. A second thickness is formed between an outer edge of the convex curved surface and an outer edge of the concave curved surface. The second thickness is less than 0.5 times the first thickness.

In an example, the lens frame has a top face and a bottom face opposite to the top face. The convex curved surface is faced toward the top face. The concave curved surface is faced toward the bottom face.

In an example, a first depth is formed between the outer edge of the convex curved surface to the top face. A second depth is formed between the outer edge of the concave curved surface to the bottom face. The ratio of the first depth to the second depth is greater than 0.9 and less than 1.1.

In an example, the ratio of the first depth to the second depth is 1.

In an example, the center of the convex curved surface protrudes from the top face.

In an example, the body includes a handle connected to the lens frame.

The present invention will become clearer in light of the following detailed description of illustrative embodiments of this invention described in connection with the drawings.

DETAILED DESCRIPTION OF THE INVENTION

Figure 1:
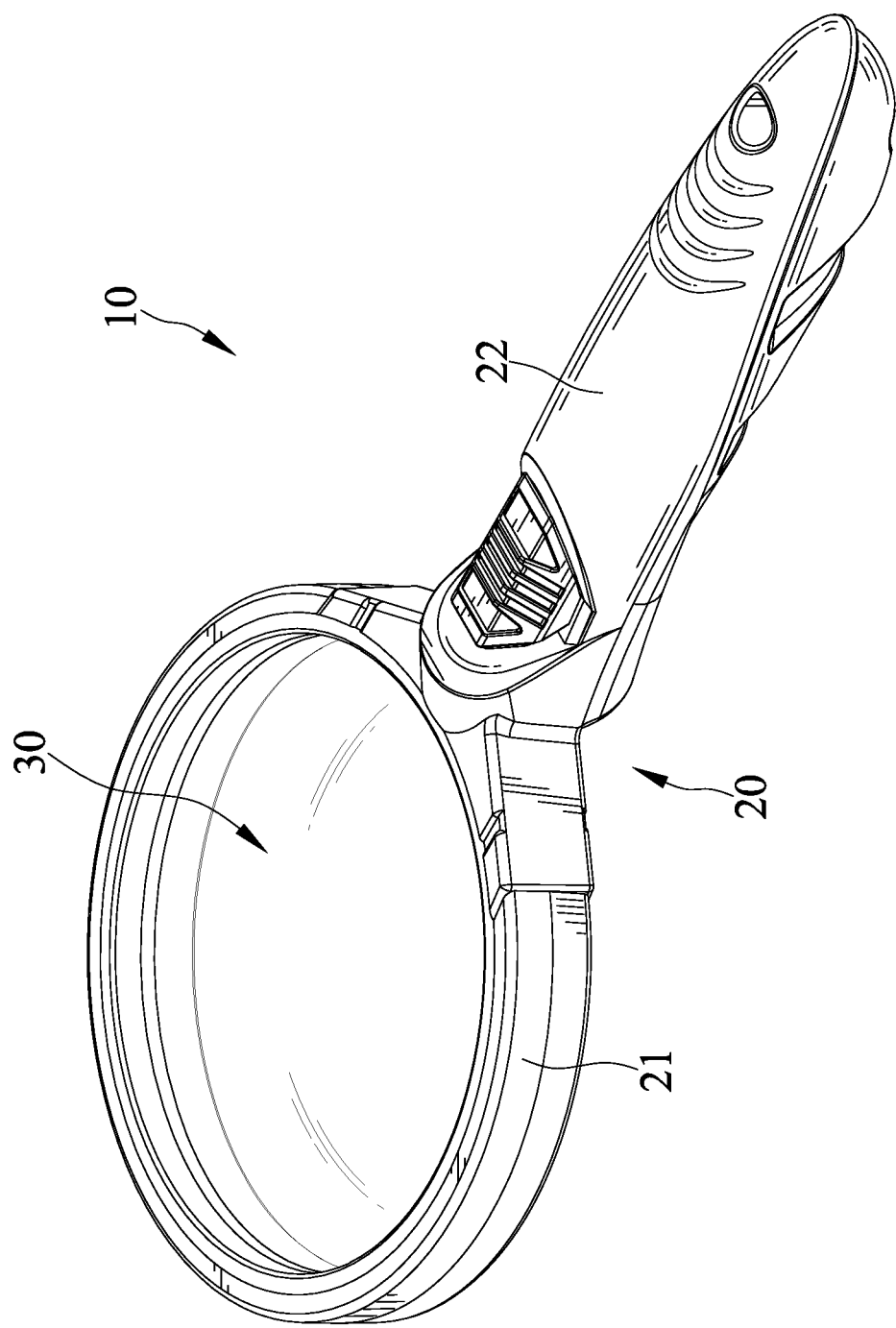
FIG. 1 is a perspective view of a handheld magnifying lens of an embodiment according to the present invention.
Figure 2:
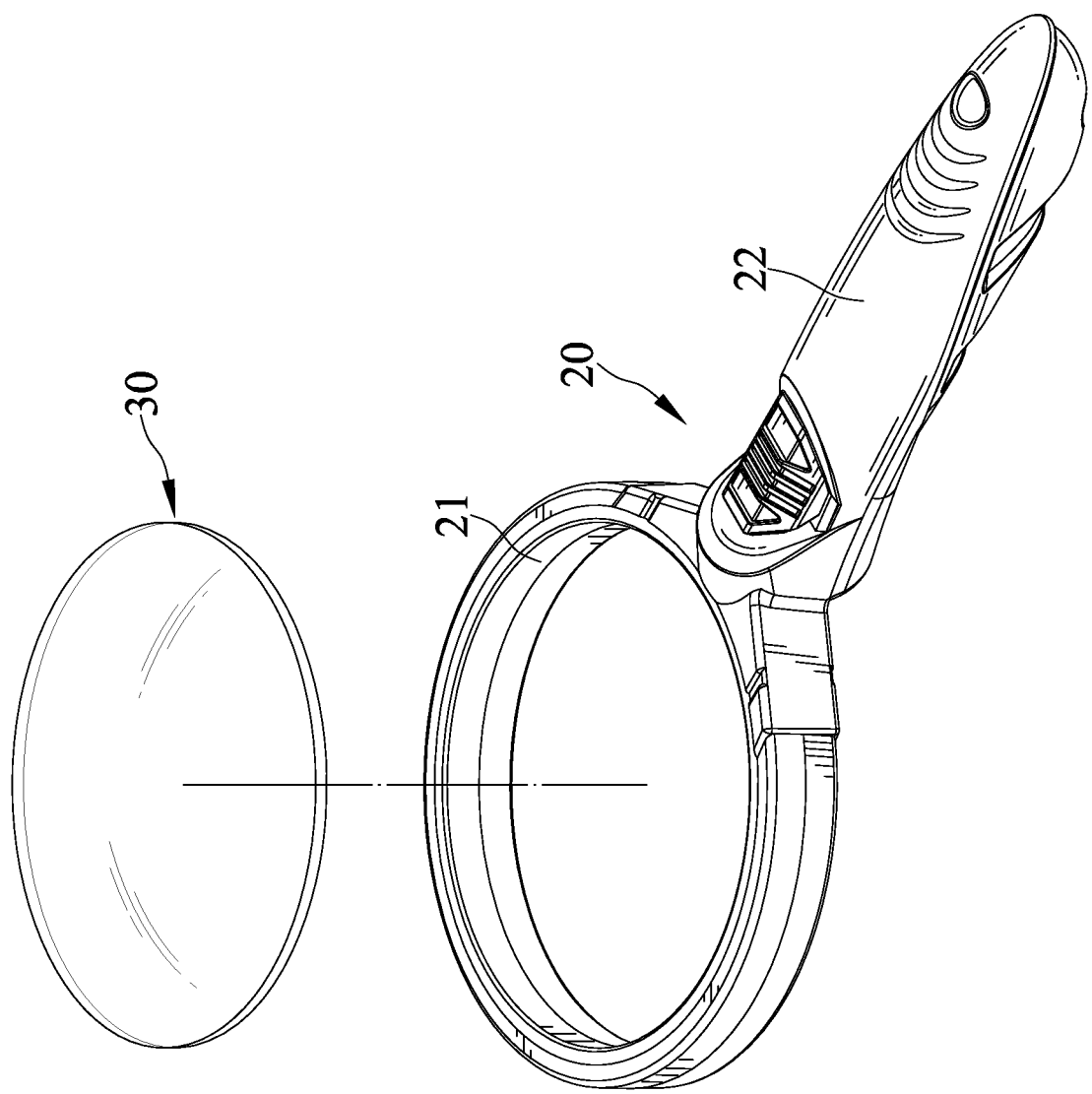
FIG. 2 is an exploded, perspective view of the handheld magnifying lens of FIG. 1.
Figure 3:
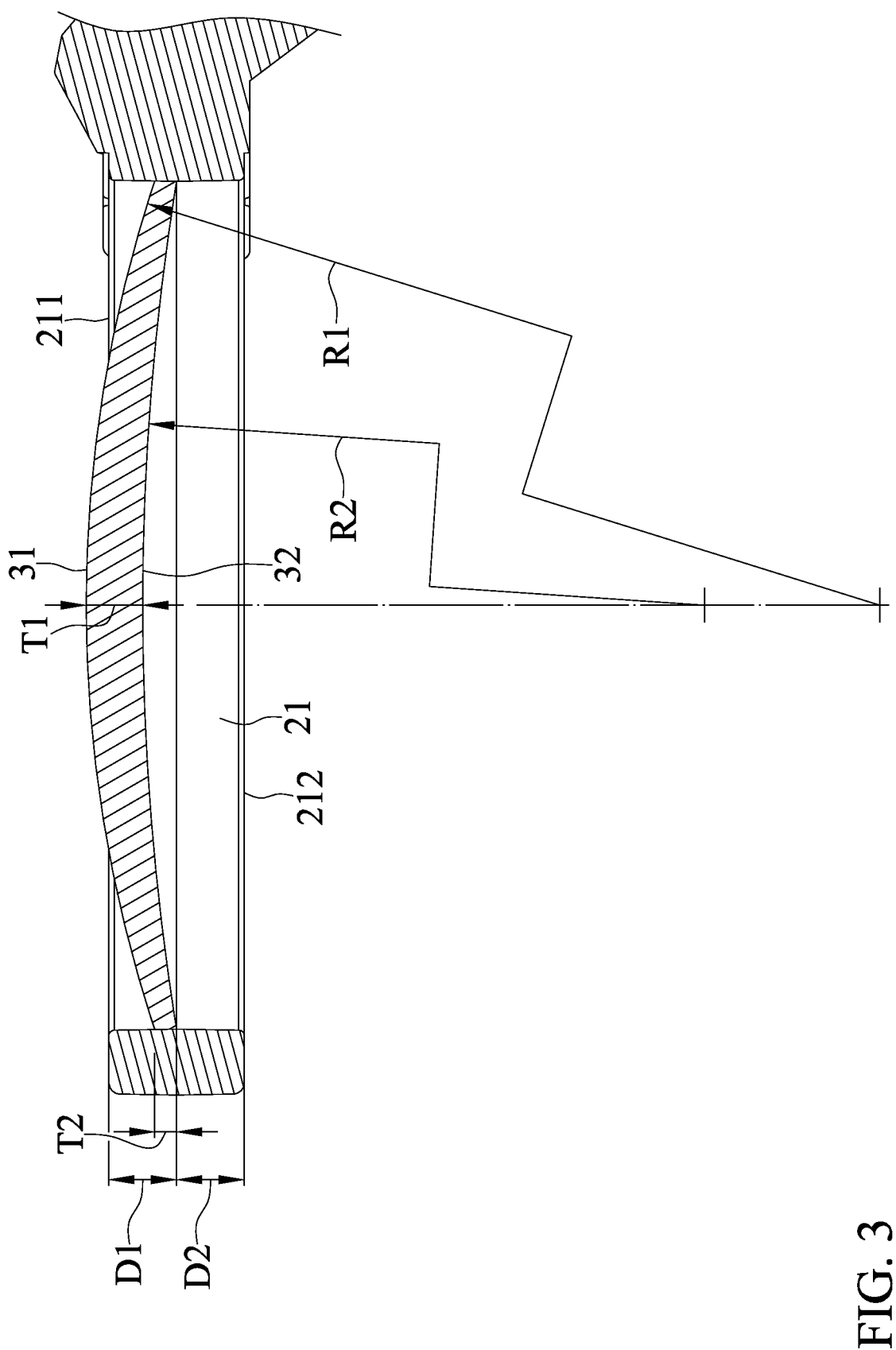
FIG. 3 is a cross sectional view of the handheld magnifying lens of FIG. 1.

With reference to FIGS. 1-3, an handheld magnifying lens 10 of an embodiment according to the present invention includes a body 20 and a lens 30.

The body 20 includes a lens frame 21 and a handle 22 connected to the lens frame 21.

The lens 30 is arranged in the lens frame 21. The lens 30 has a convex curved surface 31 and a concave curved surface 32 opposite to the convex curved surface 31. A curvature radius R1 of the convex curved surface 31 is less than a curvature radius R2 of the concave curved surface 32.

A first thickness T1 is formed between a center of the convex curved surface 31 and a center of the concave curved surface 32. A second thickness T2 is formed between an outer edge of the convex curved surface 31 and an outer edge of the concave curved surface 32. The second thickness T2 is less than 0.5 times the first thickness T1.

The lens frame 21 has a top face 211 and a bottom face 212 opposite to the top face 211. The convex curved surface 31 is faced toward the top face 211, and the concave curved surface 32 is faced toward the bottom face 212. In the embodiment, the center of the convex curved surface 31 protrudes from the top face 211.

A first depth D1 is formed between the outer edge of the convex curved surface 31 to the top face 211. A second depth D2 is formed between the outer edge of the concave curved surface 32 to the bottom face 212. The ratio of the first depth D1 to the second depth D2 is greater than 0.9 and less than 1.1. In the embodiment, the ratio of the first depth D1 to the second depth D2 is 1.

The handheld magnifying lens 10 can reduce glare through the above structure. The user can obtain the same visual magnification effect regardless of whether the user faces the convex curved surface 31 or the concave curved surface 32, but if the convex curved surface 31 is upwards and glare will be generated, the concave curved surface 32 can be changed to face upward. Since the reflection angles of the convex curved surface 31 and the concave curved surface 32 are different, the occurrence of glare can be reduced.

Although specific embodiments have been illustrated and described, numerous modifications and variations are still possible without departing from the scope of the invention. The scope of the invention is limited by the accompanying claims.

The invention claimed is:

1. A handheld magnifying lens comprising:
 a body including a lens frame; and
 a lens arranged in the lens frame, wherein the lens has a convex curved surface and a concave curved surface opposite to the convex curved surface, and wherein a curvature radius of the convex curved surface is less than a curvature radius of the concave curved surface, wherein a first thickness is formed between a center of the convex curved surface and a center of the concave curved surface, wherein a second thickness is formed between an outer edge of the convex curved surface and an outer edge of the concave curved surface, and wherein the second thickness is less than 0.5 times the first thickness.

2. The handheld magnifying lens as claimed in claim 1, wherein the lens frame has a top face and a bottom face opposite to the top face, wherein the convex curved surface is faced toward the top face, and wherein the concave curved surface is faced toward the bottom face.

3. The handheld magnifying lens as claimed in claim 2, wherein a first depth is formed between the outer edge of the convex curved surface to the top face, wherein a second depth is formed between the outer edge of the concave curved surface to the bottom face, and wherein the ratio of the first depth to the second depth is greater than 0.9 and less than 1.1.

4. The handheld magnifying lens as claimed in claim 3, wherein the ratio of the first depth to the second depth is 1.

5. The handheld magnifying lens as claimed in claim 2, wherein the center of the convex curved surface protrudes from the top face.

6. The handheld magnifying lens as claimed in claim 1, wherein the body includes a handle connected to the lens frame.

\* \* \* \* \*